United States Patent
MacMillan et al.

(10) Patent No.: US 8,276,836 B2
(45) Date of Patent: Oct. 2, 2012

(54) FUEL NOZZLE ASSEMBLIES AND METHODS

(75) Inventors: John Brandon MacMillan, Liberty, SC (US); Thomas Edward Johnson, Greer, SC (US)

(73) Assignee: General Electric Company, Schenectady, NY (US)

( * ) Notice: Subject to any disclaimer, the term of this patent is extended or adjusted under 35 U.S.C. 154(b) by 677 days.

(21) Appl. No.: 11/829,464

(22) Filed: Jul. 27, 2007

(65) Prior Publication Data
US 2009/0224082 A1  Sep. 10, 2009

(51) Int. Cl.
*B05B 1/26* (2006.01)
*B05B 1/14* (2006.01)
*B05B 1/00* (2006.01)
*F23D 14/68* (2006.01)

(52) U.S. Cl. ........ 239/596; 239/490; 239/552; 239/553; 239/553.3; 239/553.5; 239/590; 239/590.3

(58) Field of Classification Search .............. 239/5, 490, 239/533.11, 533.14, 552, 553, 553.3, 553.5, 239/585.3, 585.4, 590, 590.3, 590.5, 596, 239/600, 601, 494; 60/733, 737, 747, 776
See application file for complete search history.

(56) References Cited

U.S. PATENT DOCUMENTS

| | | | | |
|---|---|---|---|---|
| 3,532,271 A * | 10/1970 | Polnauer | | 239/1 |
| 3,680,793 A * | 8/1972 | Tate et al. | | 239/468 |
| 4,254,914 A * | 3/1981 | Shames et al. | | 239/383 |
| 4,292,801 A | 10/1981 | Wilkes et al. | | |
| 4,423,843 A * | 1/1984 | Palma | | 239/585.4 |
| 4,654,194 A * | 3/1987 | Christiansen et al. | | 376/443 |
| 4,890,794 A * | 1/1990 | Imafuku et al. | | 239/533.12 |
| 4,982,570 A | 1/1991 | Waslo et al. | | |
| 5,274,991 A | 1/1994 | Fitts | | |
| 5,934,569 A * | 8/1999 | Soule et al. | | 239/468 |
| 6,082,113 A * | 7/2000 | Prociw et al. | | 60/748 |
| 6,755,024 B1 * | 6/2004 | Mao et al. | | 60/776 |
| 7,198,201 B2 * | 4/2007 | Bowman et al. | | 239/1 |
| 2001/0050318 A1 | 12/2001 | Mansour et al. | | |
| 2005/0284965 A1 * | 12/2005 | Schneider | | 239/533.12 |

OTHER PUBLICATIONS

CN 200810144502.6, English Translation of Chinese Office Action, Jan. 12, 2011.

* cited by examiner

*Primary Examiner* — Len Tran
*Assistant Examiner* — Ryan Reis
(74) *Attorney, Agent, or Firm* — Sutherland Asbill & Brennan LLP

(57) ABSTRACT

A fuel nozzle assembly includes a nozzle body and an orifice plate. The orifice plate may be removably positioned on an interior of the nozzle body.

11 Claims, 6 Drawing Sheets

US 8,276,836 B2

FUEL NOZZLE ASSEMBLIES AND METHODS

TECHNICAL FIELD

The present application generally relates to a fuel nozzle for a combustor of a gas turbine, and more particularly relates to a primary fuel nozzle for a dry low NOx combustor of a gas turbine, and methods for making the same.

BACKGROUND OF THE INVENTION

Low NOx combustors for gas turbines are known in the industry. For example, U.S. Pat. No. 4,292,801 describes a "Dual Stage-Dual Mode Low NOx combustor" that creates reduced amounts of nitrogen oxide (NOx) during the combustion process. Such a low NOx combustor generally includes two combustion chambers. Fuel is introduced into the chambers through fuel nozzles that extend through an end cap of the combustor. More specifically, a number of primary fuel nozzles extend into a first combustion chamber and a secondary fuel nozzle extends toward a second combustion chamber. In operation, fuel is selectively introduced through the primary and secondary fuel nozzles to initiate and terminate combustion in the corresponding chambers. The combustion may be controlled in a manner that generates a relatively low level of NOx.

Each primary fuel nozzle typically includes a nozzle body, an orifice plate, and a collar. The orifice plate is positioned on an interior of the nozzle body and fuel flowing through the nozzle body passes through orifices in the orifice plate. The collar is positioned on an exterior of the nozzle body adjacent an exit end. Fuel flowing through the nozzle body passes through the exit end adjacent to the collar. The orifice plate and the collar affect the flow characteristics of the fuel and therefore the performance of the combustor.

Typically, the orifice plate and the collar are coupled to the nozzle body using a process such as brazing or electron beam welding. These processes make the orifice plate relatively difficult to remove. However, the flow of gas and air through the orifice plate may abrade the orifices so as to impact the performance of the combustor. In such a case, the primary fuel nozzle may be replaced. Further, these processes may create a fillet at the points where the collar and the nozzle body are joined. The fillet may have an uncontrolled size, shape, and surface, which may disturb the flow of fuel and air flow adjacent to the exit end of the nozzle body, again affecting the performance of the combustor.

SUMMARY OF THE INVENTION

The present application describes a fuel nozzle assembly. The fuel nozzle assembly may include a nozzle body and an orifice plate. The orifice plate may be removably positioned on an interior of the nozzle body.

The present application also describes a fuel nozzle assembly. The fuel nozzle assembly may include a nozzle body and a collar. The collar may be integrally formed on an exterior of the nozzle body.

The present application further describes a method of manufacturing a fuel nozzle assembly. The method may include creating a nozzle body and a collar. The collar may be integrally formed with the nozzle body. The method also may include creating an orifice plate, coupling the orifice plate to the nozzle body, and sealing the orifice plate to the nozzle body.

Other systems, devices, methods, features, and advantages of the disclosed primary fuel nozzle assemblies and methods will be apparent or will become apparent to one with skill in the art upon examination of the following figures and detailed description. All such additional systems, devices, methods, features, and advantages are intended to be included within the description and are intended to be protected by the accompanying claims.

BRIEF DESCRIPTION OF THE DRAWINGS

The present disclosure may be better understood with reference to the following figures. Matching reference numerals designate corresponding parts throughout the figures, and components in the figures are not necessarily to scale.

DETAILED DESCRIPTION

Figure 1:
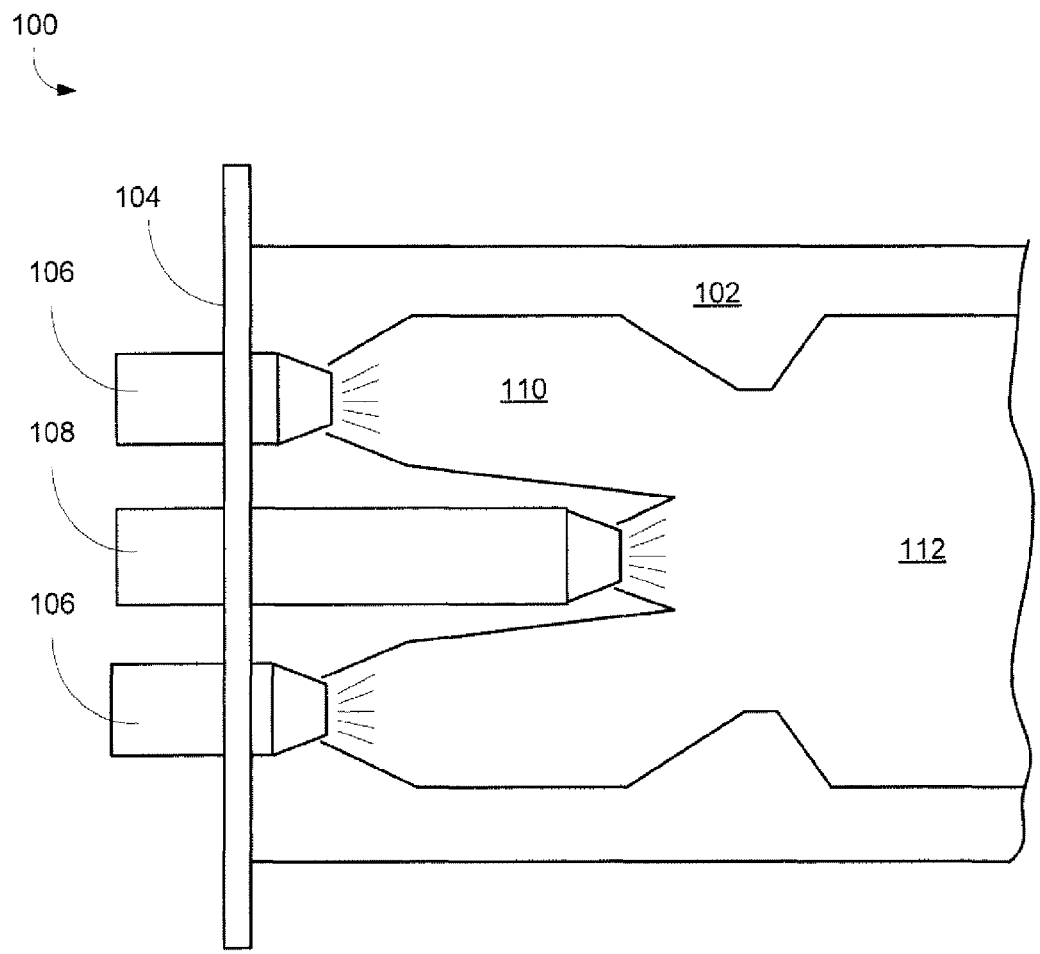
FIG. 1 is a partial cross-sectional view of a gas turbine, illustrating a combustor of the gas turbine.

FIG. 1 is a partial cross-sectional view of a gas turbine 100, illustrating a combustor 102 of the gas turbine 100. The combustor 102 may be configured to create relatively low levels of nitrogen oxide (NOx) during the combustion process. The combustor 102 may be, for example, an embodiment of the Dual Stage-Dual Mode dry low NOx combustor described in U.S. Pat. No. 4,292,801, described above. However, the principles of the present application can be applied to other combustors 102. Only one combustor 102 is shown in FIG. 1, although typically the gas turbine 100 includes a number of combustors 102 arranged in a circular array about the gas turbine 100.

The combustor 102 may have an end cover 104, a number of chambers, and a number of fuel nozzles. The nozzles may communicate fuel through the end cover 104 into the chambers. More specifically, a number of primary fuel nozzle assemblies 106 may communicate fuel into a first chamber 110 of the combustor 102, while a secondary fuel nozzle 108 communicates fuel into a second chamber 112 of the combustor 102. The fuel may be mixed with air from a compressor (not shown) via air swirlers (not shown) to create pressurized air that drives the turbine (not shown). Because the use of the secondary fuel nozzle 108 to create low NOx combustion is known, further description is omitted here.

Figure 2:
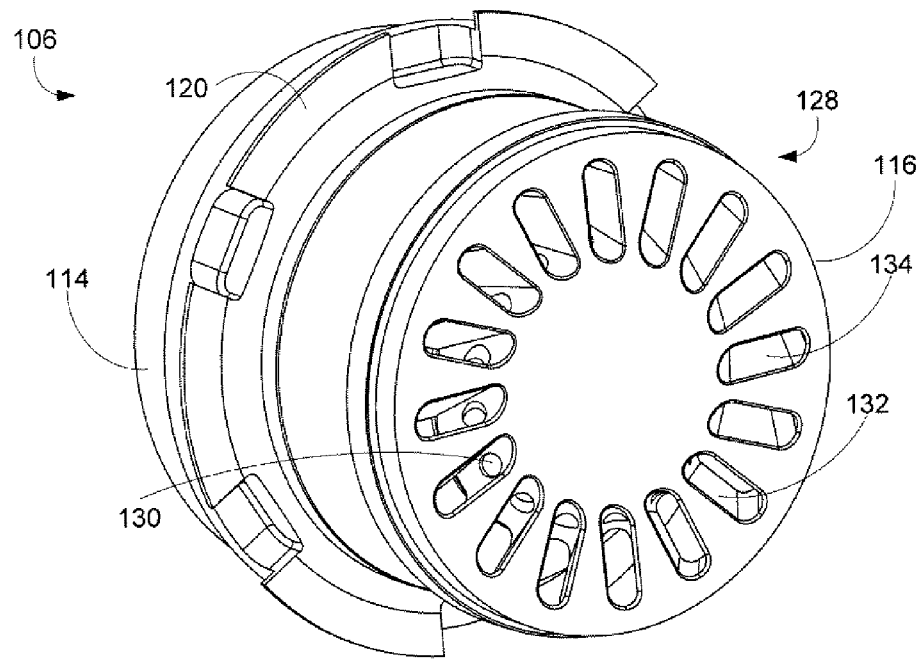
FIG. 2 is a perspective view of an embodiment of a primary fuel nozzle assembly.
Figure 3:
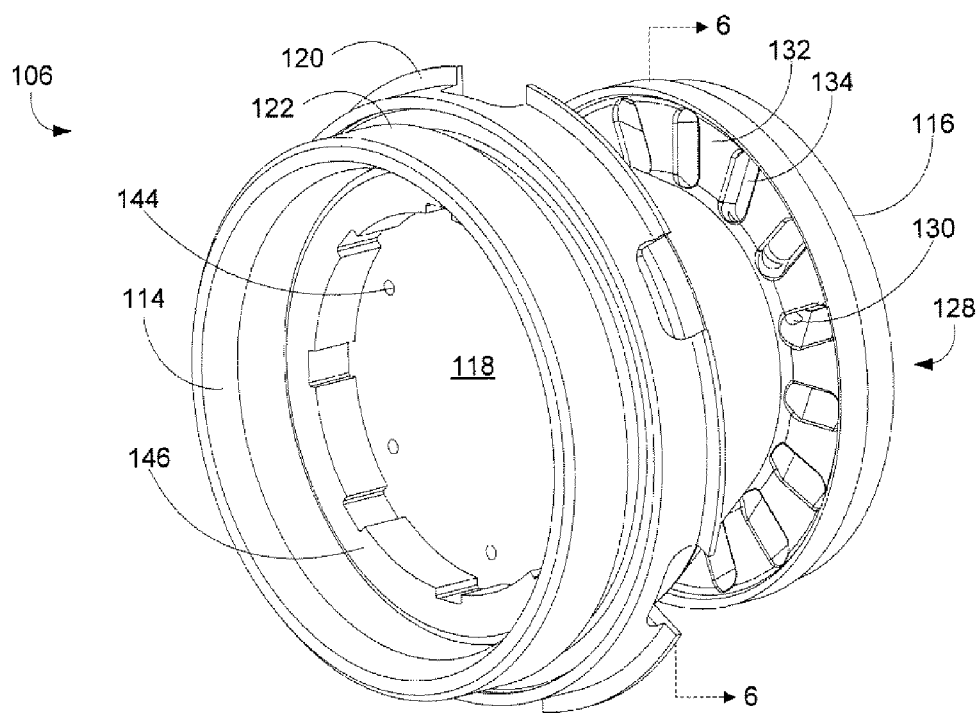
FIG. 3 is a perspective view of the primary fuel nozzle assembly shown in FIG. 2.

FIGS. 2 and 3 are perspective views of an embodiment of a primary fuel nozzle assembly 106 that can be used with a low NOx combustor, such as the combustor 102 shown in FIG. 1. The primary fuel nozzle assembly 106 generally includes a nozzle body 114, a collar 116, and an orifice plate 118, which are described in further detail below. A locking member and a seal (not shown) also may be positioned on an exterior of the nozzle body 114 at locations 120 and 122 respectively.

Figure 4:
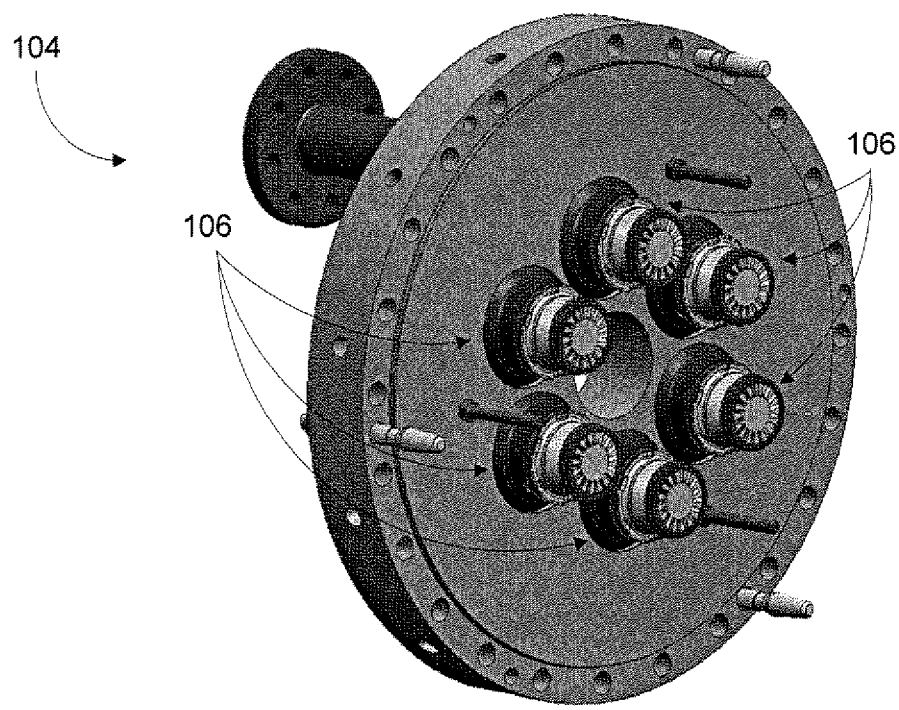
FIG. 4 is a perspective view of an end cover of the combustor, illustrating a number of primary fuel nozzle assemblies positioned in the end cover.

The primary fuel nozzle assembly 106 may be configured to be positioned in the end cover 104 of the combustor 102 as shown in FIG. 4. The locking member 120 and the gasket 122 may create a secure yet removable seal between the primary fuel nozzle assembly 106 and the end cover 104. Although the combustor 102 may be used with any number of primary fuel nozzle assemblies 106 organized in any arrangement, six (6) primary fuel nozzle assemblies 106 are shown herein in a circular array. Such a configuration may be found on turbines manufactured by the General Electric Company of Schenectady, N.Y., such as its MS7001EA turbine, among others. The secondary fuel nozzle 108 is not shown in FIG. 4 for the purpose of clarity.

The primary fuel nozzle assembly 106 is configured to enable the introduction of fuel through the end cover 104 and into the first combustion chamber 110. With reference back to FIGS. 2 and 3, the nozzle body 114 may have a relatively hollow interior and an exit end 128. At the exit end 128, a number of apertures 130 may be formed through the nozzle body 114 to allow fuel to exit therethrough. A number of vanes 132 may extend from the nozzle body 114 adjacent the apertures 130. The vanes 132 extend outward in a radial direction. The vanes 132 may be enclosed along an outer periphery by the collar 116. The exterior of the nozzle body 114, the vanes 132, and an interior surface of the collar 116 define a number of windows 134. The windows 134 are positioned in a manner that corresponds with the apertures 130 such that fuel exiting the apertures 130 passes into the windows 134. Air passing through the windows 134 may be mixed with the fuel to create an air/fuel combination that is burned in the combustion chambers 110, 112.

The geometry of the exit end of the primary fuel nozzle assembly 106 may affect the ratio of air and fuel in the air/fuel combination. For example, the sizing and relative position of the apertures 130, the vanes 132, the collar 116, and the windows 134 may be relevant components of the overall geometry. Typically, the geometry is selected to create an air/fuel combination having a specific ratio of fuel and air such that combustion occurs as desired. Therefore, the primary fuel nozzle assembly 106 may be manufactured to achieve the desired geometry.

More specifically, the collar 116 may be integrally formed with the nozzle body 114, such that the collar 116 and the nozzle body 114 have a unitary construction. The unitary construction obviates the need for separately attaching the collar 116 to the nozzle body 114 using a process such as brazing or welding. To achieve the unitary construction, the nozzle body 114 and collar 116 may be machined. For example, the nozzle body 114 and the collar 116 may be machined using a controlled machining process, such as a computer numerically controlled (CNC) machining process. A suitable CNC machining process may be performed using a machine having a multi-axis CNC machining center, or a machine configured for electrical discharge machining (EDM), among others. Other machining processes may also be used. Additionally, the nozzle body 114 and the collar 116 may be cast such that these pieces have a unitary construction. Still other manufacturing process that are suited to achieve a unitary construction may be employed herein. The nozzle body 114 and collar 116 may be formed from a unitary piece of material, such as stainless steel.

Figure 6:
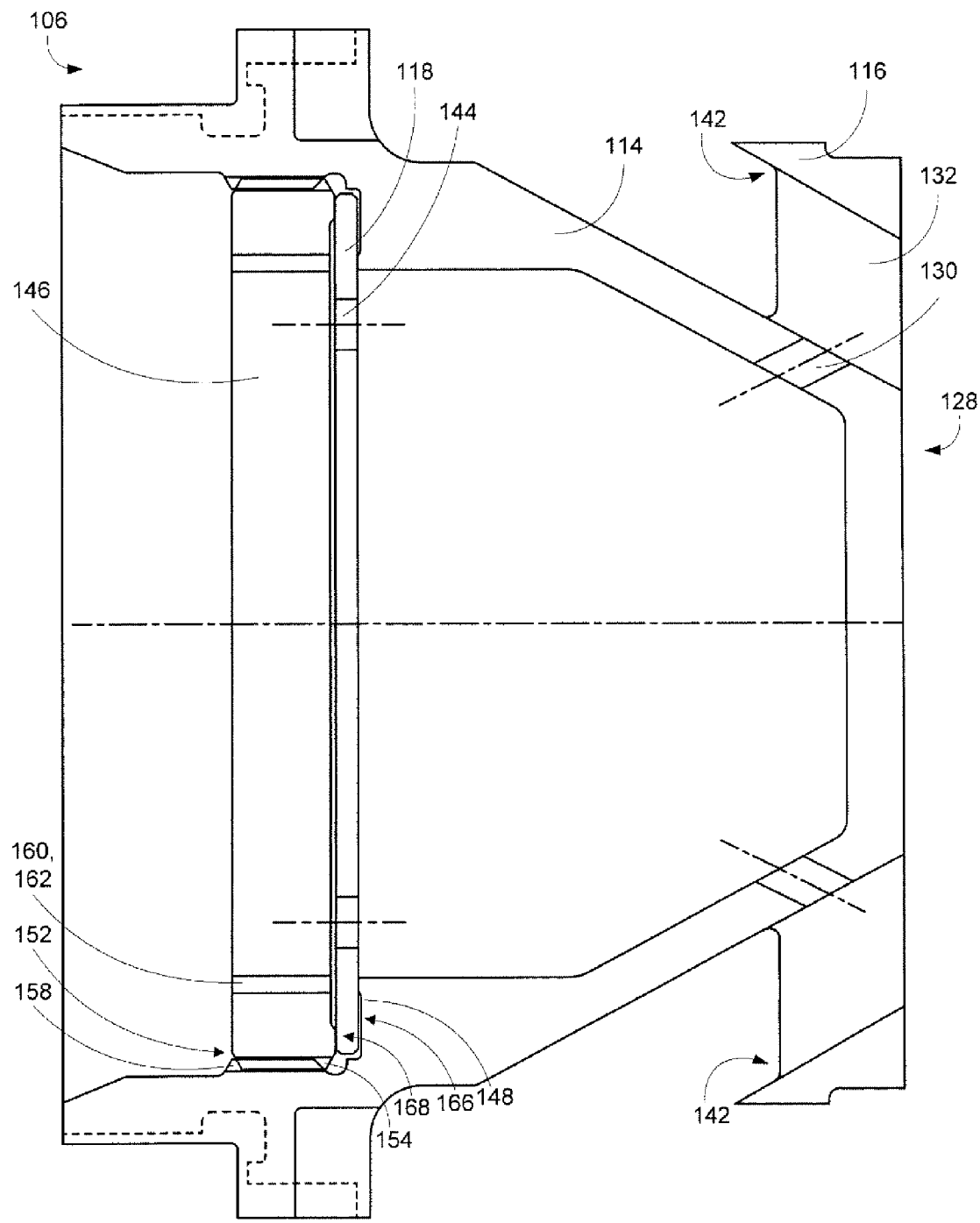
FIG. 6 is a cross-sectional view of the primary fuel nozzle assembly shown in FIG. 3, taken along line 6-6.

FIG. 6 is a cross-sectional view of the primary fuel nozzle assembly 106 taken along line 6-6. The interior surface of the collar 116 may be relatively conical. Each of the vanes 132 may have an exterior surface that connects to a portion of the interior surface of the collar 116. As is shown, an intersection 142 may be formed between the interior surface of the collar 116 and the exterior surface of each vane 132. For example, the intersections 142 may be relatively angular or may form a slight curve or radius. The intersections 142 are relatively uniform around the collar 116. For example, the intersections 142 may vary by less than about 0.005 inches. Therefore, air and fuel may be uniformly distributed about the exit end 128 of the nozzle body 114. The ratio of fuel in the air/fuel combination may be relatively consistent and the temperature within the combustion chambers 110, 112 may be controlled. As a result, NOx generation within the combustion chambers 110, 112 may be reduced.

When the collar 116 is brazed or welded to the nozzle body 114, a flow of an alloy is used to create a joint or fillet at each intersection 142. Because the flow of alloy may be relatively difficult to control, the joint may vary in size and shape across the intersection 142 causing the cross sectional area of the windows 134 to vary. The joint may be inspected at the time of manufacture to validate that a secure connection was created. The joint also may be inspected with use to validate the joint has not failed. Specifically, the components that form the joint are placed in contact with fuel and air passing through the windows 134 during operation of the combustor 102 and the fuel and air may be at different temperatures. For example, the fuel may have a temperature as low as about 70° F. to about 80° F. while the air may have a temperature as high as about 700° F. Thus, during normal operation of the combustor 102, the joint may be subjected to differing rates of thermal expansion so as to place the joint under sufficient tension to cause stress or possible failure. When the collar 116 is integrally formed with the nozzle body 114, on the other hand, the intersections 142 of the collar 116 and nozzle body 114 may be relatively uniform about the nozzle body 114. For example, the intersections 142 may vary within tolerances of about +/−0.005 inches. Therefore, the primary fuel nozzle assembly 106 may have less variation in cross sectional area and may be able to tolerate relatively higher stress without failing.

With reference back to FIGS. 2 and 3, the primary fuel nozzle assembly 106 also may include the orifice plate 118. The orifice plate 118 is removable and is configured to be positioned on the interior of the nozzle body 114. A number of the orifices 144 may be formed through the orifice plate 118 such that fuel can flow through the orifices 144 toward the apertures 130. The volume of fuel passed to the apertures 130 is affected by the pressure differential across the orifice plate 118 and the size and shape of the orifices 144. Because the orifice plate 118 is removable, the orifice plate 118 may be changed when the orifices 144 become worn by the fuel. The orifice plate 118 can also be substituted with a different orifice plate 118 to vary the operation of the combustor 102. As is shown in, for example, FIG. 3, each of the orifices 144 may lead to a pair of the downstream apertures 130 of the nozzle body 114.

Figure 5:
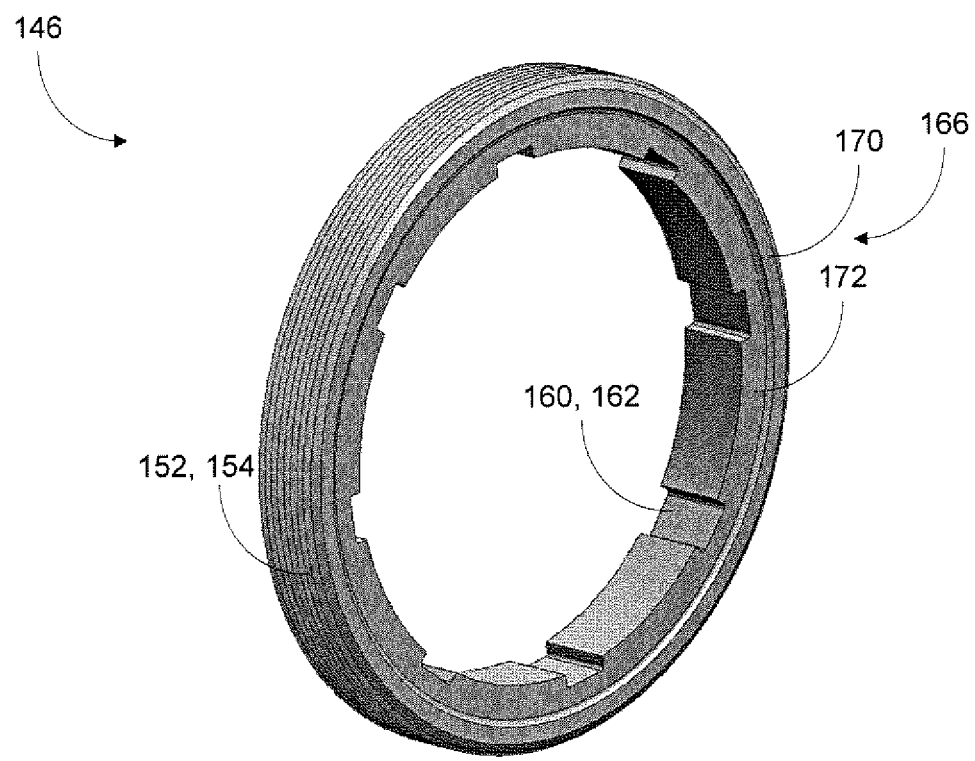
FIG. 5 is a perspective view of an embodiment of a retaining ring.

FIG. 5 is a perspective view of an embodiment of a retaining ring 146. With reference to FIG. 6, the orifice plate 118 may be held in place by the retaining ring 146. More specifically, the orifice plate 118 may be positioned between a flange 148 on the nozzle body 114 and the retaining ring 146. The flange 148 may extend inward into the interior of the nozzle body 114, forming a stop that prevents the orifice plate 118 from moving farther into the nozzle body 114. The retaining ring 146 may be configured to couple releasably to an interior surface of the nozzle body 114 adjacent to the flange 148. The retaining ring 146 thus forms a stop that prevents the orifice plate 118 from moving farther out of the nozzle body 114. Thus, when the orifice plate 118 is positioned between the flange 148 and the retaining ring 146, the orifice plate 118 is retained in place.

In order for the retaining ring 146 to be coupled to the interior surface of the nozzle body, the retaining ring 146 and the nozzle body 114 may be equipped with a coupling mechanism 152. For example, the coupling mechanism 152 may be threads 154 on an exterior surface of the retaining ring 146. The threads 154 may be configured to engage threads 158 on the interior surface of the nozzle body 114. In other embodiments, other coupling mechanisms 152 may be used to releasably couple the retaining ring 146 to the interior surface of the nozzle body 114.

In order for the retaining ring 146 to be released to remove the orifice plate 118, the retaining ring 146 may be equipped with a releasing mechanism 160. For example, the retaining ring 146 may have a shape that corresponds to the shape of a tool (not shown). Because of the corresponding shapes, the tool can mate with the retaining ring 146. The tool can apply a torque to the retaining ring 146 such that the retaining ring 146 may be removed. As is shown in FIG. 5, the releasing mechanism 160 may include a number of recesses 162 formed on an interior surface of the retaining ring 146. The recesses 162 may be configured to be engaged by a tool having corresponding protrusions (not shown), such that the retaining ring 146 may be removed. In other embodiments, the releasing mechanism 160 may have other configurations.

The primary fuel nozzle assembly 106 further may include a sealing mechanism 166 that is configured to form a seal between the orifice plate 118 and the interior surface of the nozzle body 114. The sealing mechanism 166 may prevent fuel from flowing around a periphery 168 of the orifice plate 118 toward the apertures 130. Therefore, the volume of fuel passing through the orifice plate 118 may be controlled and the ratio of fuel in the air/fuel combination may be relatively consistent.

Figure 7:
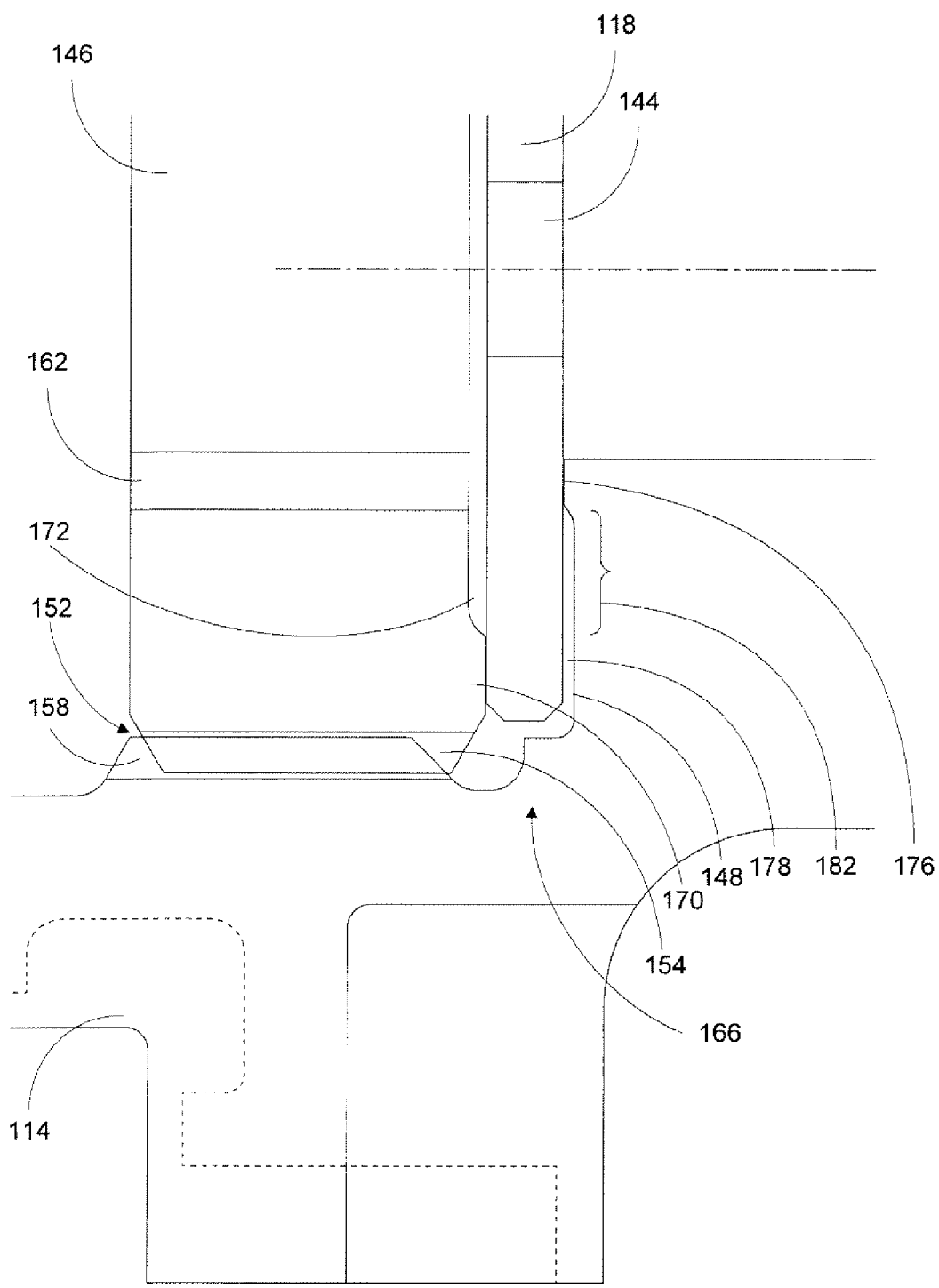
FIG. 7 is a partial cross-sectional view of the primary fuel nozzle assembly shown in FIG. 3 taken along line 6-6, illustrating a sealing mechanism of the assembly.

The sealing mechanism 166 is best shown in FIG. 7, which is a partial cross-sectional view of the primary fuel nozzle assembly 106. As is shown, the sealing mechanism 166 may include a protruding rim 170 and a relief area 172 on a forward face of the retaining ring 146. The sealing mechanism 166 also may include a protruding rim 176 and a relief area 178 on a rearward face of the flange 148. The rims 170, 176 are spaced apart from each other by a space 182. The rims 170, 176 may be configured to apply a bending moment to the orifice plate 118 when the retaining ring 146 is tightened. More specifically, the bending moment may be applied about a periphery 168 of the orifice plate 118. The bending moment may be sufficient to cause the orifice plate 118 to bend but not cause the orifice plate 118 to yield. Because the orifice plate 118 does bend, a seal may be formed about the periphery 168 of the orifice plate 118. The seal persists when the operation of the combustor 102 causes the components of the primary fuel nozzle assembly 106 to experience varying rates of thermal expansion. Instead of becoming unsealed, the bending moment is reduced and the orifice plate 118 either relaxes or returns to equilibrium.

The relief areas 172, 178 may be configured to allow the orifice plate 118 to deflect under the bending moment. In other words, the orifice plate 118 may initially bend into the relief areas 172, 178 so that the seal is formed. Additionally, the relief areas 172, 178 act as stops that prevent the orifice plate 118 from bending beyond a pre-defined limit. For example, the relief areas 172, 178 may be sized such that the orifice plate 118 bends without yielding or deforming. In other embodiments, the sealing mechanism 166 may have other configurations.

Although not necessary, a fail-safe mechanism may be provided to ensure that the retaining ring 146 cannot come loose during operation of the combustor 102. For example, a number of tack-welds (not shown) may be applied between the retaining ring 146 and the nozzle body 114. The tack-welds are relatively secure yet removable. Alternatively, other fail-safe mechanisms can be used, such as a retaining pins or tabs (not shown).

Because the orifice plate 118 can be removed, the orifice plate 118 may be repaired or replaced when the orifices 144 become abraded. The orifice plate 118 also may be replaced when a different fuel composition is desired. In either case, the nozzle body 114 may be re-used, reducing inventory costs and the quantity of inventory that is maintained. The sealing mechanism 166 ensures the orifice plate 118 and flange 148 remain sealed over a range of temperature and flow conditions, allowing for varying rates of thermal expansion.

Figure 8:
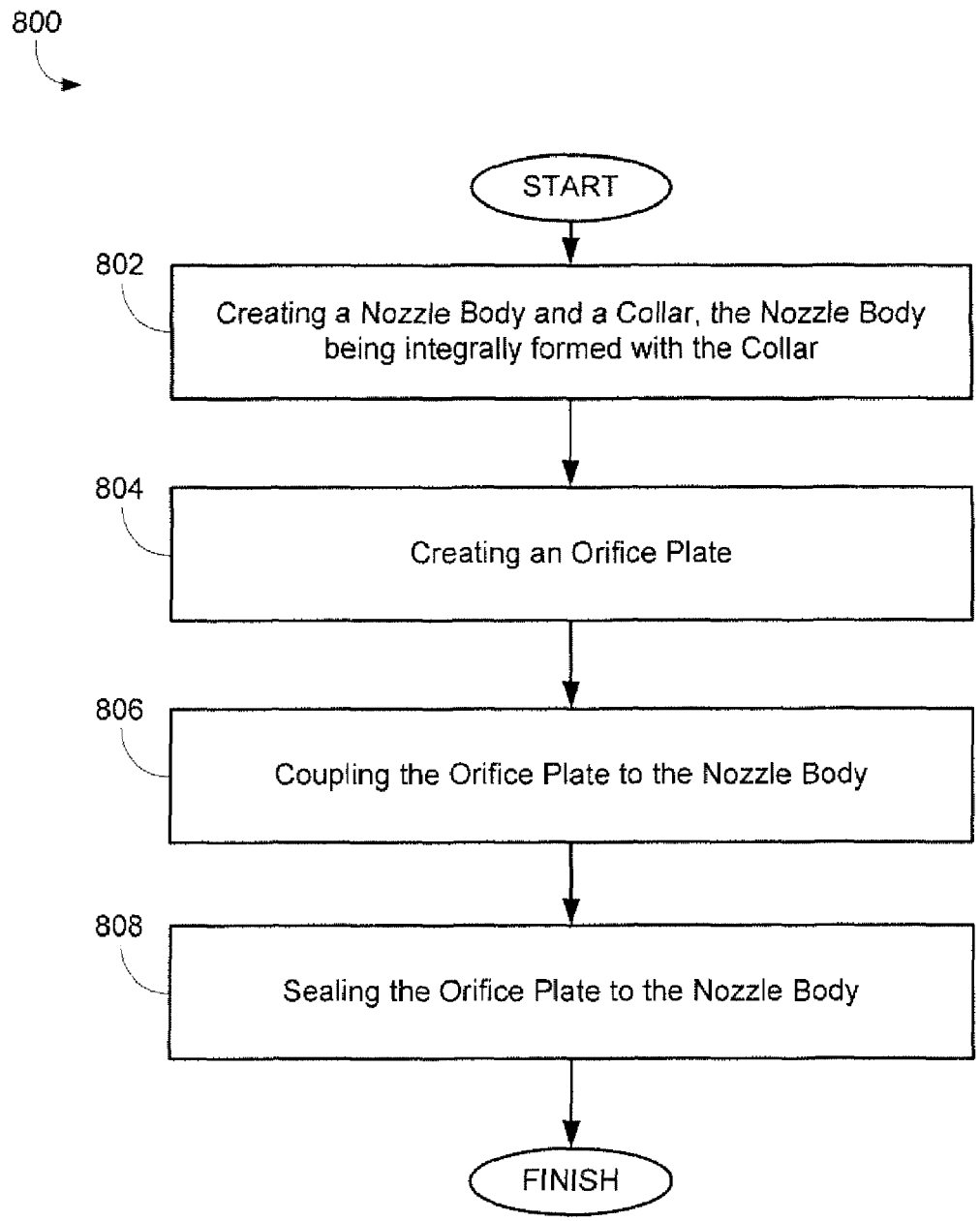
FIG. 8 is a block diagram illustrating an embodiment of a method of manufacturing a primary fuel nozzle assembly.

FIG. 8 is a block diagram illustrating an embodiment of a method 800 of manufacturing a primary fuel nozzle assembly. In block 802, a nozzle body and collar may be created. The collar is integrally formed with the nozzle body. For example, the nozzle body and the collar may be formed from a unitary piece of material. The nozzle body and collar may be formed using a machining process or a casting process, among others, as described above.

In block 804, an orifice plate is created. For example, the orifice plate may be created using a machining process, among others. One machining process that can be used is a CNC machining process. Creating the orifice plate further includes creating a number of orifices through the orifice plate.

In block 806, the orifice plate may be coupled to the nozzle body. In some embodiments, the orifice plate may be permanently coupled to the nozzle body using a brazing process or a welding process. In other embodiments, the orifice plate may be releasably coupled to the nozzle body. For example, the orifice plate may be releasably coupled to the nozzle body by positioning the orifice plate between a flange on the nozzle body and a removable retaining ring. The removable retaining ring may be coupled to the nozzle body to retain the orifice plate against the flange. For example, the removable retaining ring may have threads that are positioned to engage threads on the nozzle body.

In block 808, the orifice may be sealed to the nozzle body. In embodiments in which the orifice plate is coupled to the nozzle body using a brazing process, the seal may be formed by brazing an entire periphery of the orifice plate. In embodiments in which the orifice plate is removably coupled to the nozzle body using the retaining ring, the retaining ring and the flange may be used to apply a bending moment to the orifice plate around a periphery of the orifice plate.

Although particular embodiments of primary fuel nozzle assemblies and methods have been disclosed in detail in the foregoing description and figures for purposes of example, those skilled in the art will understand that variations and modifications may be made without departing from the scope of the disclosure. All such variations and modifications are intended to be included within the scope of the present disclosure, as protected by the following claims.

We claim:

1. A fuel nozzle assembly comprising:
a nozzle body;
a flange extending into the nozzle body;

wherein the nozzle body comprises a plurality of nozzle body orifices for a flow of fuel and a plurality of vanes for the flow of fuel and a flow of air;

an orifice plate;

wherein the orifice plate comprises a plurality of orifices and is spaced apart from the plurality of nozzle body orifices and the plurality of vanes of the nozzle body; and wherein each of the plurality of orifices leads to only a pair of the plurality of nozzle body orifices; and a retaining ring;

wherein the orifice plate may be removably positioned between the flange of the nozzle body and the retaining ring.

2. The fuel nozzle assembly of claim 1, wherein the retaining ring comprises a coupling mechanism to removably couple the retaining ring to the nozzle body.

3. The fuel nozzle assembly of claim 2, wherein the coupling mechanism comprises a plurality of coupling threads formed on the retaining ring, the coupling threads configured to engage a plurality of threads on the nozzle body.

4. The fuel nozzle assembly of claim 1, wherein the retaining ring comprises a releasing mechanism to remove the orifice plate from the nozzle body.

5. The fuel nozzle assembly of claim 4, wherein the releasing mechanism comprises a plurality of recesses on the retaining ring.

6. The fuel nozzle assembly of claim 1, wherein the retaining ring comprises a sealing mechanism to seal the orifice plate and the nozzle body.

7. The fuel nozzle assembly of claim 6, wherein the sealing mechanism comprises a rim that is spaced apart from a rim on the flange of the nozzle body, the rims applying a bending moment to the orifice plate as the retaining ring is tightened.

8. The fuel nozzle assembly of claim 1, further comprising a collar that is integrally formed on an exterior of the nozzle body.

9. The fuel nozzle assembly of claim 1, further comprising a collar, wherein an angular intersection is formed between the nozzle body and the collar.

10. The fuel nozzle assembly of claim 9, wherein the collar comprises a plurality of windows therethrough.

11. The fuel nozzle assembly of claim 10, wherein the nozzle body and the collar comprise a unitary piece of material.

* * * * *